United States Patent
Lingafelt et al.

(10) Patent No.: US 10,666,556 B2
(45) Date of Patent: *May 26, 2020

(54) APPLICATION INFORMATION BASED NETWORK ROUTE MODIFICATION

(71) Applicant: INTERNATIONAL BUSINESS MACHINES CORPORATION, Armonk, NY (US)

(72) Inventors: Charles S. Lingafelt, Durham, NC (US); James W. Murray, Durham, NC (US); James T. Swantek, Canton, GA (US); James S. Worley, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,073

(22) Filed: Jul. 11, 2018

(65) Prior Publication Data

US 2018/0324086 A1 Nov. 8, 2018

Related U.S. Application Data

(63) Continuation of application No. 14/844,664, filed on Sep. 3, 2015, now Pat. No. 10,069,722.

(51) Int. Cl.
*H04L 12/721* (2013.01)
*H04L 12/707* (2013.01)
(Continued)

(52) U.S. Cl.
CPC ............. *H04L 45/38* (2013.01); *H04L 43/08* (2013.01); *H04L 43/0852* (2013.01);
(Continued)

(58) Field of Classification Search
CPC ...................................................... H04L 45/38
See application file for complete search history.

(56) References Cited

U.S. PATENT DOCUMENTS 7,437,463 B1   10/2008  Valletutti et al.
9,979,636 B2    5/2018  Lingafelt et al.
(Continued)

OTHER PUBLICATIONS

Charles S. Lingafelt, et al., "Application Information Based Network Route Modification", U.S. Appl. No. 15/956,997, filed Apr. 19, 2018.

(Continued)

*Primary Examiner* — Jason E Mattis
(74) *Attorney, Agent, or Firm* — Cantor Colburn LLP; Samuel Waldbaum (57) ABSTRACT

Technical solutions for optimization of network resources are described. One general aspect includes a method, including measuring, by a controller, an attribute of network route being used to communicate a network flow between a first apparatus and a second apparatus. The method also includes comparing, by the controller, a predetermined threshold and the attribute. The method also includes in response to the attribute being non-compliant with the predetermined threshold, selecting, by the controller, an alternative network route to communicate the network flow between the first apparatus and the second apparatus. The method also includes routing, by the controller, the network flow to be communicated via the alternative route between the first apparatus and the second apparatus.

20 Claims, 7 Drawing Sheets

(51) Int. Cl.
*H04L 12/26* (2006.01)
*H04L 12/801* (2013.01)

(52) U.S. Cl.
CPC .......... *H04L 43/0876* (2013.01); *H04L 45/22* (2013.01); *H04L 47/29* (2013.01); *H04L 43/087* (2013.01); *H04L 43/16* (2013.01); *H04L 47/18* (2013.01)

(56) References Cited

U.S. PATENT DOCUMENTS

| | | |
|---|---|---|
| 2011/0167147 A1 | 7/2011 | Andersson et al. |
| 2013/0132603 A1 | 5/2013 | Cohen et al. |
| 2013/0135995 A1* | 5/2013 | Wu ........................ H04W 36/06 370/229 |
| 2013/0223218 A1* | 8/2013 | Vasseur ................... H04L 45/34 370/232 |
| 2013/0332764 A1* | 12/2013 | Juang .................... H04L 49/109 713/324 |
| 2014/0023041 A1* | 1/2014 | Zhao ................. H04W 36/0011 370/331 |
| 2014/0098678 A1 | 4/2014 | Lumezanu et al. |
| 2014/0153572 A1 | 6/2014 | Hampel et al. |
| 2014/0204743 A1* | 7/2014 | Garcia .................... H04L 47/18 370/231 |
| 2014/0269331 A1 | 9/2014 | Pfeifer et al. |
| 2014/0269691 A1 | 9/2014 | Xue et al. |
| 2015/0124583 A1 | 5/2015 | May et al. |
| 2015/0163152 A1 | 6/2015 | Algoblu |
| 2017/0048115 A1* | 2/2017 | Wang .................... H04L 41/082 |
| 2017/0070423 A1 | 3/2017 | Lingafelt et al. |

OTHER PUBLICATIONS

List of IBM Patents or Patent Applications Treated as Related; (Appendix P), Filed Jul. 11, 2018; 2 pages.
Das et al. "Application-Aware Aggregation and Traffic Engineering in a Converged Packet-Cuircuit Network," Department of Electrical Engineering, Stanford University, California 94305, USA, pp. 1-3.
Khetrapal et al., "Demystifying Routing Services in Software-Defined Networking," aricent.com 2013 Aricent Group, pp. 1-12.

* cited by examiner

APPLICATION INFORMATION BASED NETWORK ROUTE MODIFICATION

DOMESTIC PRIORITY

This application is a continuation of U.S. patent application Ser. No. 14/844,664, filed Sep. 3, 2015, the disclosure of which is incorporated by reference herein in its entirety.

BACKGROUND

The present application relates to communication networks, and more specifically, to Software Defined Networking (SDN).

Typically, network routing of a communication packet is based on a router-to-router protocol (for example, Border Gateway Protocol (BGP), Open Shortest Path First (OSPF)). The router-to-router protocols, based on predefined link weighting, create a preferred routing path through a network for packets, based on the packets destination address and a physical location that the packet entered the network. In this structure, the link identities, the route identities, and the router identities are static and the routing paths over these specific links are typically not changed, except in response to a link or router failure condition. SDN facilitates dynamic creation of a route between two or more network endpoints. The SDN may selectively apply the route to a communication packet moving between the endpoints. The dynamic route may be considered an overlay network that is utilized by specific communication packets.

SUMMARY

One general aspect includes a method, including measuring, by a controller, an attribute of network route being used to communicate a network flow between a first apparatus and a second apparatus. The method also includes comparing, by the controller, a predetermined threshold and the attribute. The method also includes in response to the attribute being non-compliant with the predetermined threshold, selecting, by the controller, an alternative network route to communicate the network flow between the first apparatus and the second apparatus. The method also includes routing, by the controller, the network flow to be communicated via the alternative route between the first apparatus and the second apparatus.

Another general aspect includes an apparatus including a communication interface, and a processor. The processor receives, via the communication interface, from a source application, a specification for a predetermined type of a network flow, where the apparatus routes the network flow across a plurality of route nodes to a destination application. The processor detects a network flow of the predetermined type from the source application being routed via a first route. The processor selects a route to transmit the network flow from the source application to the destination application according to the specification from the source application. In addition to a path through the network, selection of a route may include selecting one or more aspects of the consumption specification, such as a time period that the information is conveyed and a minimum throughput, a maximum throughput, a maximum jitter and other such aspects.

One general aspect includes a computer program product including a non-transitory computer readable storage medium including computer executable instructions. The non-transitory computer readable storage medium includes instructions to detect a network flow between a source application and a destination application. The non-transitory computer readable storage medium includes instructions to determine a first route for the network flow. The non-transitory computer readable storage medium includes instructions to receive an attribute of the first route for the network flow. The non-transitory computer readable storage medium includes instructions to compare the attribute with a predetermined range from a specification from the source application. In response to the attribute being non-compliant with the predetermined range, a collection of alternative routes for the network flow may be identified. The non-transitory computer readable storage medium includes instructions to select an alternative route from the collection, and move the network flow from the first route to the alternative route selected.

BRIEF DESCRIPTION OF THE DRAWINGS

The examples described throughout the present document may be better understood with reference to the following drawings and description. The components in the drawings are not necessarily to scale. Moreover, in the drawings, like-referenced numerals designate corresponding parts throughout the different views.

DETAILED DESCRIPTION

Technical solutions for optimization of network resources are described. The techniques described include observing characteristics of network communication between two or more applications based on a network administrator defined attributes. The network administrator may decide which attributes are important for particular types of communication. For example, the network administrator may select latency, average utilization, peak utilization, jitter, or a combination thereof. Based on the selection, a system causes an optimized route to be instantiated and used for the communication. Alternatively or in addition, the system may select the optimized route from a collection of possible routes. Alternatively or in addition, a source application informs the system of the communication characteristics between the source application and a destination application. Using such additional information, the system may observe corresponding attributes of the communication and optimize the route based on the attributes selected by the network administrator to optimize.

In a communication network, such as a computer network, a method of determining a route used by a communication packet from a source device to a destination device may be improved upon by utilizing Software Defined Networking (SDN). For example, a SDN controller may dynamically establish a route across the network for a specific flow and subsequently may remove the route if it is no longer used. Further, the SDN controller may use the dynamic route to reroute a subset of packets from the source to the destination, while the remaining packets between the two devices traverse a different route. By establishing and using the route dynamically, the SDN controller improves the efficiency of the network, while, for example by subjecting the packet to additional latency or limiting the flow's throughput. For example, the SDN controller may establish the route based on a current state of the network and the flow's attribute, or information conveyed by a source application about usage of the network or other such factors. For example, the source application may convey information that facilitates the SDN controller to schedule the route for the packet so as to better utilize the overall network, such as by transmitting the packet at a lower latency.

Figure 1:
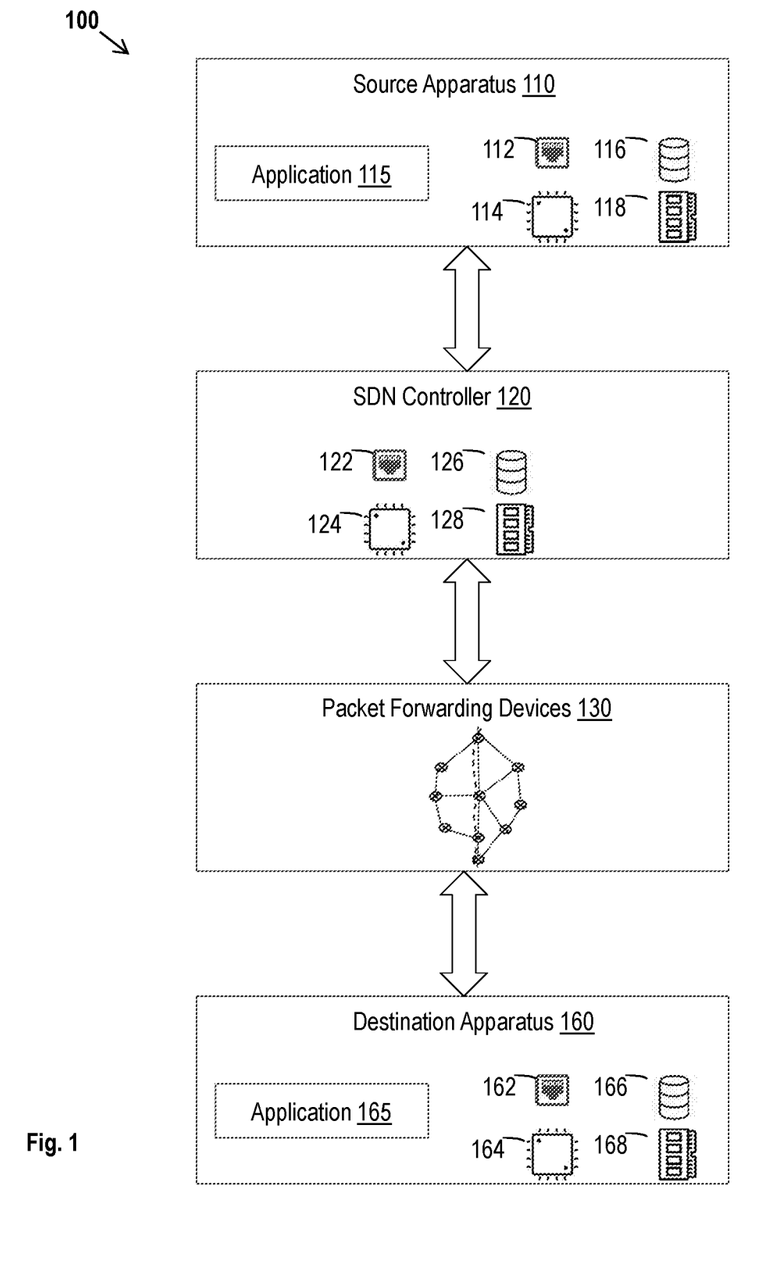
FIG. 1 illustrates an example SDN.

FIG. 1 illustrates an example SDN 100. The system includes a source apparatus 110, a SDN controller 120, packet forwarding devices 130, and a destination apparatus 160. The system may include other components not shown in the illustration.

The source apparatus 110 is a communication apparatus that transmits a packet for communication across the SDN 100. The source apparatus 110 may be a computer such as a server, a desktop, a laptop, or any other computer. Alternatively or in addition, the source apparatus 110 may be a phone, a virtual machine, a tablet, or any other device that may communicate data across the SDN 100. In an example, the source apparatus 110 includes hardware such as a processor 114, a memory 116, a computer readable storage 118, and a communication interface 112. The source apparatus 110 may communicate data via the communication interface 112.

The source apparatus 110 executes a software application such as a source application 115. For example, the memory 116 and/or the computer readable storage 118 may include instructions executable by the processor 114 to execute the source application 115. The source application 115 may be a program that causes the source apparatus 110 to transmit the data across the SDN 100.

The destination apparatus 160 is a communication apparatus that receives the packet communicated across the SDN 100. The destination apparatus 160 may be a computer such as a server, a desktop, a laptop, or any other computer. Alternatively or in addition, the destination apparatus 160 may be a phone, a virtual machine, a tablet, or any other device that may communicate data across the SDN 100. The destination apparatus 160 may be separate from the source apparatus 110. In an example, the destination apparatus 160 includes hardware such as a processor 164, a memory 166, a computer readable storage 168, and a communication interface 162. The destination apparatus 160 may communicate data via the communication interface 162.

The destination apparatus 160 may execute a software application, such as a destination application 165. For example, the memory 166 and/or the computer readable storage 168 may include instructions executable by the processor 164 to execute the destination application 165. The destination application 165 may be a program that receives the data transmitted by the source apparatus 110 across the SDN 100.

The SDN controller 120 may be an apparatus that manages a route used to communicate the data from the source apparatus 110 to the destination apparatus 160 across the SDN 100. The SDN controller 120 may be a computer such as a server, a desktop, a laptop, or any other computer. Alternatively or in addition, the destination apparatus 160 may be a phone, a virtual machine, a tablet, or any other device that manages the SDN 100. In an example, the SDN 100 includes hardware such as a processor 124, a memory 126, a computer readable storage 128, and a communication interface 122. In an example, the memory 126 includes logic, such as in the form of instructions, executable by the processor 124. Executing the instructions may determine the route for communicating the packet from the source apparatus 110 to the destination apparatus 160.

The route for communicating the packet is a set of packet forwarding devices from the packet forwarding devices 130 that are used to communicate the packet to the destination apparatus 160. The packet forwarding devices 130 include multiple routing nodes such as routers, switches, cables, and other physical network traffic network devices. In an example, the packet forwarding devices 130 may include virtual traffic forwarding elements. The SDN controller may be in communication with each route node in the packet forwarding devices 130. For illustration clarity, FIG. 2 does not show a connection between each route node and the SDN controller 120, although such a connection, either wired or wireless, exists.

Figure 2:
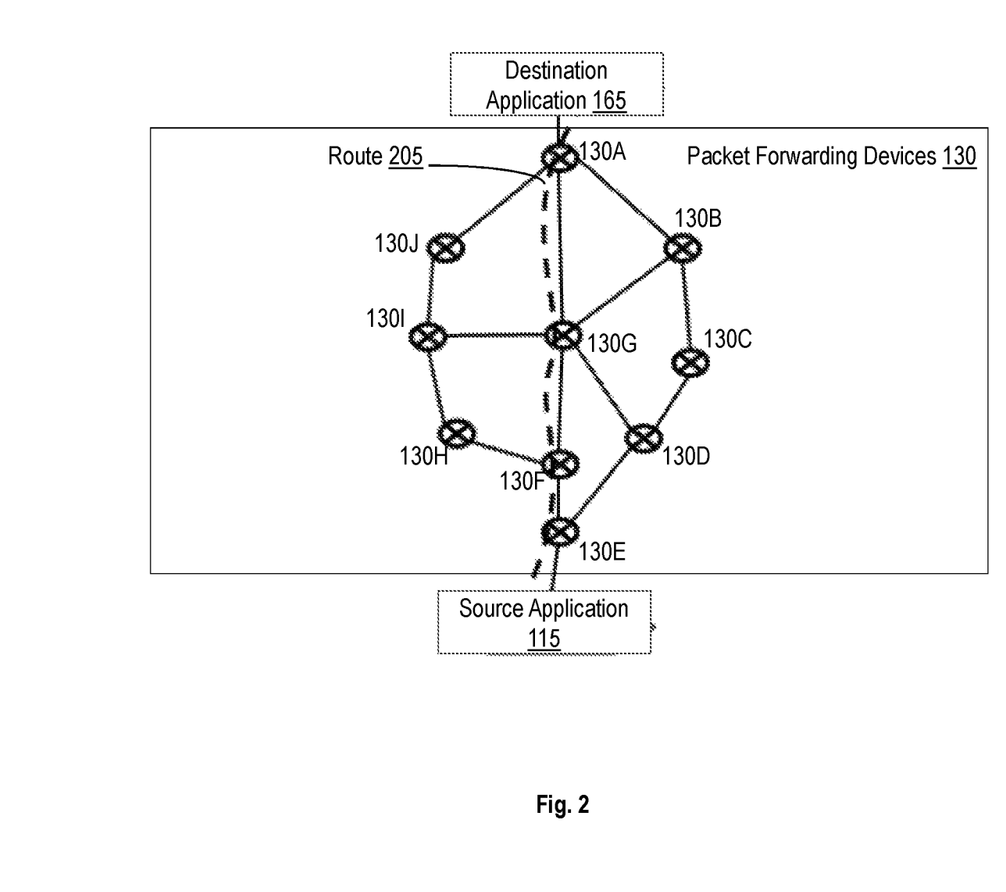
FIG. 2 illustrates an example route in an SDN.

FIG. 2 illustrates an example route in an SDN. A communication packet between the source application 115 and the destination application 165 may traverse a route 205 (illustrated by dashed lines). The route 205 includes multiple route nodes 130E, 130F, 130G, and 130A, which are sequentially connected by links (solid lines). The SDN controller 120 may determine the route 205 based on the route 205 being a predetermined route between the source application 115 and the destination application 165. Alternatively or in addition, the route nodes from the packet forwarding devices 130 may determine the route 205 collectively in a distributed manner. For example, the SDN controller 120 may transmit the packet to the route node 130E, which is a next hop node from the source application. The route node 130E may select the route node 130F as the next node of the route based on a destination of the packet and status of the link between the route node 130E and the route node 130F. The route node 130E may have one or more outgoing links that may be used to transmit the packet to the destination application 165. The route node 130E may select the route node 130F as the next node based on latency, throughput, data volume, or any other attribute associated with the outgoing links. The next node, in this case the route node 130F, may follow a similar process to select a subsequent node of the route 205, in this case the route node 130G. Thus, the route nodes may collectively determine the route 205. In this case, since each route node selects the next route node of the route 205, the route 205 may not be the optimal route from a perspective of an overall operation of the SDN 100.

The optimal route may vary based on a goal setup for the SDN 100. For example, a network policy may specify a goal for the SDN 100. For example, the network policy may specify an order of priority among attributes of the route nodes and/or the links between the route nodes. For example, the network policy may indicate that maximum utilization of the links between the route nodes takes precedence over throughput. Alternatively or in addition, the network policy may indicate that latency of the packet to reach the destination application 165 may be secondary to the utilization of the links. It is understood other examples may prioritize network attributes such as latency, throughput, data volume, utilization, and others in an order that is different from what is described in this application.

The SDN controller 120 may identify an alternative route than a predetermined route, or a route determined by the route nodes, based on the network policy. The SDN controller 120 may determine a route between the source application 115 and the destination application 165 that optimizes the network attributes identified in the network policy. The SDN controller 120 subsequently switches the communication to the determined alternative route.

Figure 3:
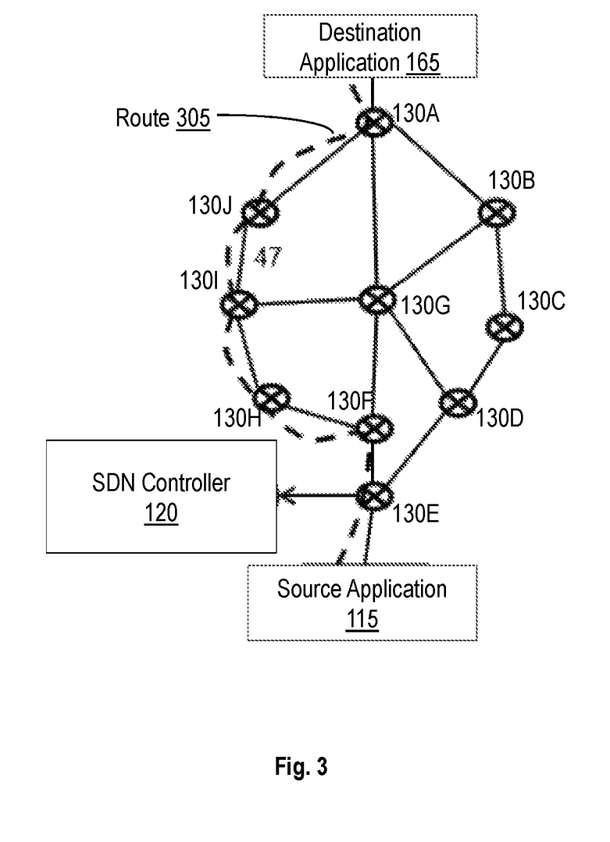
FIG. 3 illustrates an example alternative route identified by an SDN controller.

FIG. 3 illustrates an alternative route identified by the SDN controller. For example, one or more route nodes may provide information about the packet flow to the SDN controller 120. The information about the packet flow may include amount of data being communicated, time of day, day of the week, and other attributes of the data being communicated. In addition, the route nodes may provide measurements of the network attributes such as latency, throughput, utilization, and other attributes to the SDN controller 120. The SDN controller 120 may create an overlay network for that specific flow or add the flow to the overlay network if one already exists. In an example, the SDN controller may receive measurement attributes from all the route nodes in the SDN 100, and not just the route nodes of the route 205. The SDN controller 120, upon receiving the attribute measurements, may identify a route 305 based on the network policy to optimize the overall network, rather than the specific flow.

For example, the SDN controller 120 may identify that link 47 (between 130I-130J) is being lightly utilized. The SDN controller 120 may further determine that changing the packet to traverse the route 305 instead of the route 205 introduces additional latency within the flow, due to the route 305 being "longer" than the route 205. The SDN controller 120 may further determine that the additional latency does not adversely affect the source application 115 (and/or the destination application 165). Accordingly, the SDN controller 120 may route the communication from the source application 115 and the destination application 165 along the route 305, thus increasing the packet latency and increases the overall efficiency of the network by utilizing alternative links than those in the route 205. Although the example alternative route, route 305 in this case, illustrates an alternative path, in other examples, the SDN controller 120 may select the same path (as the illustrated route 205) through the SDN 100, at a different time, or with different parameters such as jitter, throughput, latency, or any other network parameters. Thus, in addition to selection of a path through the SDN 100, selection of the alternative route may include selecting one or more aspects of the consumption specification, such as a time period that the information is conveyed, a minimum throughput, a maximum throughput, a maximum jitter, and other such aspects.

Figure 4:
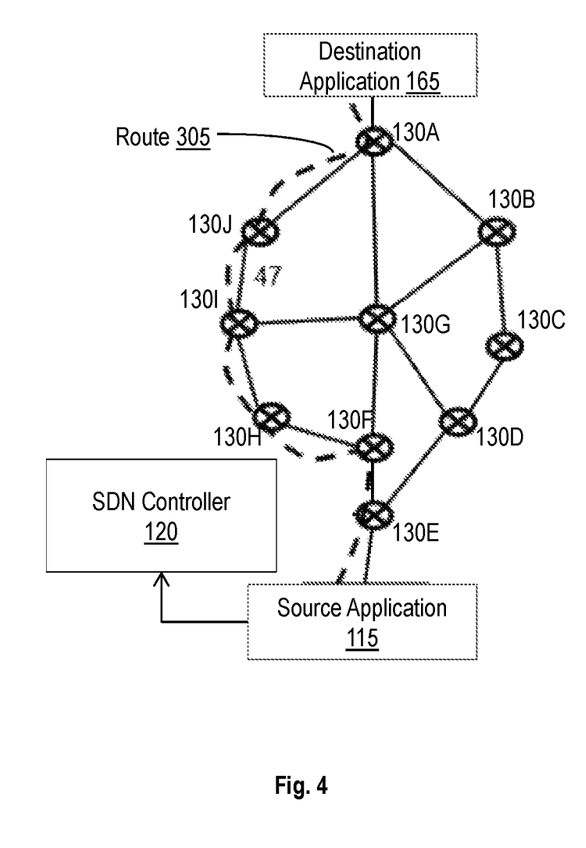
FIG. 4 illustrates an example alternative route identified by an SDN controller.

FIG. 4 illustrates an alternative route identified by the SDN controller. The SDN controller 120 may identify the route 405 in response to receiving packet flow information from the source application 115. Thus, the source application may provide the SDN controller with information, which the SDN controller 120 may use to improve the network routing, which may enhance operations of traditional data centers and cloud infrastructures. For example, the source application 115 may identify measurable attributes of a packet flow to the SDN controller 120, for a cost, a jitter, a time of day, a day of week, or other attributes. The source application 115 may provide the attributes as either bounds (lower/upper) or specific values that are to be complied with. For example, the source application 115 may indicate a jitter value that is acceptable, that is a threshold jitter value for the source application 115 to operate optimally. Alternatively or in addition, the source application 115 may identify a threshold latency value for optimal operation. Alternatively or in addition, the source application 115 may identify that the packet flow is scheduled to initiate a scheduled time, such as a predetermined time of a predetermined day.

For example, the packet flow may be a broadcast of a media, such as a presentation, a video, an audio or other media, at 2:00 PM on Monday, Aug. 3, 2015. Accordingly, the source application 115 may identify to the SDN controller 120 to route the packet flow with a latency value and a jitter value at the scheduled time for the presentation to be displayed smoothly. Thus, in this case, due to the real time nature of the packet flow (such as media broadcast), the latency and jitter may take precedence over other network attributes such as utilization and cost. In another example, the packet flow may be a migration of an email account. The email account transfer may be scheduled to complete within a week. In this case, the source application 115 may identify to the SDN controller 120 to route the packet flow based on utilization and cost, and yet complete by the scheduled time. The SDN controller 120 may identify the route according to the packet flow information provided by the source application 115. A network administrator may identify the packet flow and the corresponding attributes to be prioritized. Alternatively or in addition, the network attributes to be prioritized may be identified automatically.

Figure 5:
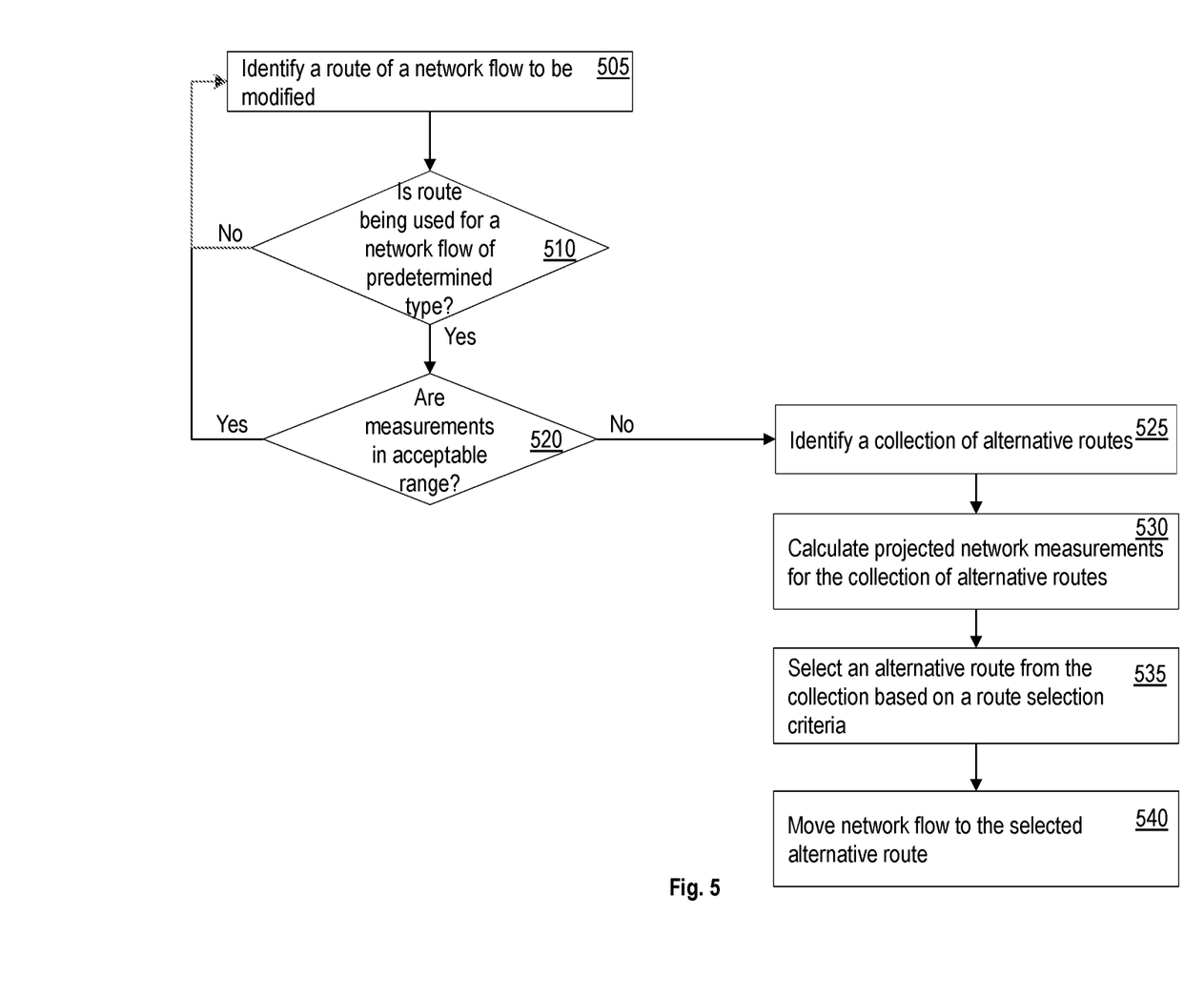
FIG. 5 is a flow diagram illustrating example logic of selecting an alternative route in accordance with an embodiment.

FIG. 5 illustrates example logic of selecting an alternative route. The SDN controller 120 may implement at least a part of the logic. The logic may be included in instructions stored on the computer readable storage 128 and/or memory 126, and executed by the processor 124. The SDN controller 120 may receive a request to modify the route 205. (505). For example, the network administrator may identify the route 205 for modification. Alternatively or in addition, the network administrator may identify types of routes that the SDN controller 120 may modify. Alternatively or in addition, the network policy may identify the type of routes to modify. The SDN controller 120 may identify the route 205 in response to the route 205 being of a type of route to be modified. The SDN controller 120 receives alternative route selection criteria such as lowest cost; minimize jitter; time of day; day of week, or any other criteria or a combination thereof. The network administrator may provide the selection criteria.

The SDN controller 120 identifies if the identified route is being used to communicate a network flow of a predetermined type. (510). For example, the network administrator may identify the type of network flows that the SDN controller 120 may observe and adjust. Alternatively or in addition, the network policy may specify the network flows that the SDN controller 120 may modify. For example, the SDN controller 120 may modify the route 205 for a network flow of the type File Transfer Protocol (FTP), Secure File Transfer Protocol (SFTP), or Simple Mail Transfer Protocol (SMTP). Other characteristics or attributes of network flows may be specified than the illustrated attribute of protocol.

If the SDN controller 120 identifies that the route 205 is communicating a network flow of one of the types identified, the SDN controller may compare network attributes of the route with threshold values. (520). For example, the network administrator or the network policy may specify the threshold values. For example, the threshold values may specify acceptable ranges for one or more measurable attributes such as utilization, latency, jitter, or other such attributes. Further, the measurement threshold values may be singular measures, such as utilization of a specific link of the route 205, or an aggregated measure, such as, average or peak utilization along the entire route 205. The network administrator or the network policy may specify thresholds for each measurement.

If the measurements of the route 205 are in the specified acceptable range, the SDN controller 120 moves the communication to the new route 305. Alternatively, the network administrator may initiate the SDN controller 120 to move the communication to the new route 305. To this end, the SDN controller 120 may identify a collection of alternative routes (525). The collection may include all possible candidate routes that the SDN controller 120 may use to transport data from the source application 115 to the destination application 165. The SDN controller 120 may calculate projected attribute measurements for the collection of alternative routes. The SDN controller may determine aggregated measures for the alternative routes if aggregate thresholds are specified. The projected network measurements are predicted values of the network attributes if packets from the network flow are transported using the route 305 instead of the route 205. The SDN controller 120 may select the route 305 from the collection of alternative routes using the projected network measurements based on the route selection criteria. (535). For example, for an alternative route, the SDN controller 120 may compare the projected network measurements with the specified thresholds, and mark the alternative route as acceptable if projected measurements meet the specified thresholds. Else, the SDN controller 120 may mark the alternative route as unacceptable. The SDN controller 120 may rank the acceptable alternative routes.

For example, the SDN controller 120 may rank the alternative routes according to the selection criteria such as cost, jitter, time of transfer, or a combination thereof. For example, if the selection criteria specify selection of an alternative route with minimum cost, the alternative routes may be ranked according to their respective costs. The SDN controller 120 may calculate the cost associated with the alternative route based on a cost associated with communicating across each link in the alternative route. The cost may depend on the time of the day or the day of the week, on which the SDN controller schedules the network communication. Accordingly, the SDN controller 120 may use information associated with the network flow. The source application 115 may specify the scheduling information, or alternatively, the SDN controller 120 may identify an optimal schedule for the transfer to minimize the cost based on a predetermined cost schedule that the SDN controller may access. In other examples, the SDN controller 120 may select the route 305 from the collection of alternative acceptable routes based on different factors. For example, the route 305 may be selected because it minimizes latency, has the least effect on route and/or link utilization, is a preferred route, is a random selection, is a least recently used route, is a most recently used route, or for any other factor or a combination thereof.

Further, the SDN controller 120 may use the singular measurement for each link in the route or aggregated measurements of the route for ranking and selecting the route 305. The SDN controller 120 may aggregate the measurements as a simple average, a weighted average or any other aggregation technique. For example, if aggregated route utilization is used as the selection criteria, the SDN controller 120 may calculate a simple average of all of the link utilization values. Alternatively, the SDN controller 120 may calculate a weighted link utilization average if specific links are considered more significant than others, as specified by the network administrator or the network policy.

In an example, the SDN controller may move the network flow from the route 205 to the route 305 for a predetermined class of traffic. The network administrator or the network policy may specify the class of traffic for which the network flow is to be moved. The SDN controller 120 may identify the class of service based on the type of traffic or may receive an identification of the class from the source application 115. For example, traffic classes may be provisioned with specific types of traffic in each class such as real-time voice is class 1, network control is class 2, general user is class 3, tape backup is class 4, and other provisions.

Upon identification and selection of the route 305 that meets the acceptable range of thresholds and further determining that the route 305 complies with the specified selection criteria, the SDN controller 120 moves the network flow from the route 205 to the route 305. Thus, the SDN controller 120 identifies the network flow communicated between the source application 115 and the destination application 165 via the route 205 based on the communication causing the SDN 100 to be non-compliant with predetermined thresholds of measurable network attributes. The network flow may be of a specified type, and may include communication of a specified class of data. The predetermined thresholds affected may be in a different part of the SDN 100, away from the route 205. In response, the SDN controller 120 may identify the alternative route 305 that optimizes operation of the SDN 100 based on the selection criteria specified by the network administrator or the network policy. The SDN controller subsequently moves the network flow communication to the route 305.

Table 1 provides example routines that may be executed by the SDN controller 120 to implement the example methods described throughout the present application.

TABLE 1

Determine if route should be moved Routine:
For each route or route type defined the administrator as being candidate for re-routing
    For each flow measurement
        Obtain flow measures /*these measures can be link specific, as well as an aggregation of link measurements */
        if aggregated flow measures exists then calculate aggregated flow measures
    end_for
    if (flow measures > flow measure action threshold) or (aggregated flow measure > aggregated flow measure action threshold) then go to move route routine
End for
Identify collection of alternative acceptable routes
For each alternative route,
    obtain flow measurements
    if aggregated flow measures exists then calculate aggregated flow measures
    Determine projected flow measures and projected aggregated flow measures if packets (from the current route) were moved to this (alternative) route TABLE 1-continued

```
        If (projected flow measurements > max flow measurement value) or (projected
        aggregated flow measure > max aggregated flow measurement value) then mark
        alternative route as not acceptable, else mark alternative route as acceptable
End For
Implement the routing change
Do while there are acceptable routes in the collection
        For the highest ranked route in the collection,
                If the SDN controller confirms route can be changed to the move_to_route,
                        then command the SDN to make the route change and exit from the do_while
                        loop.
                else remove this route from the alternative acceptable route collection
End_do while
```

Figure 6:
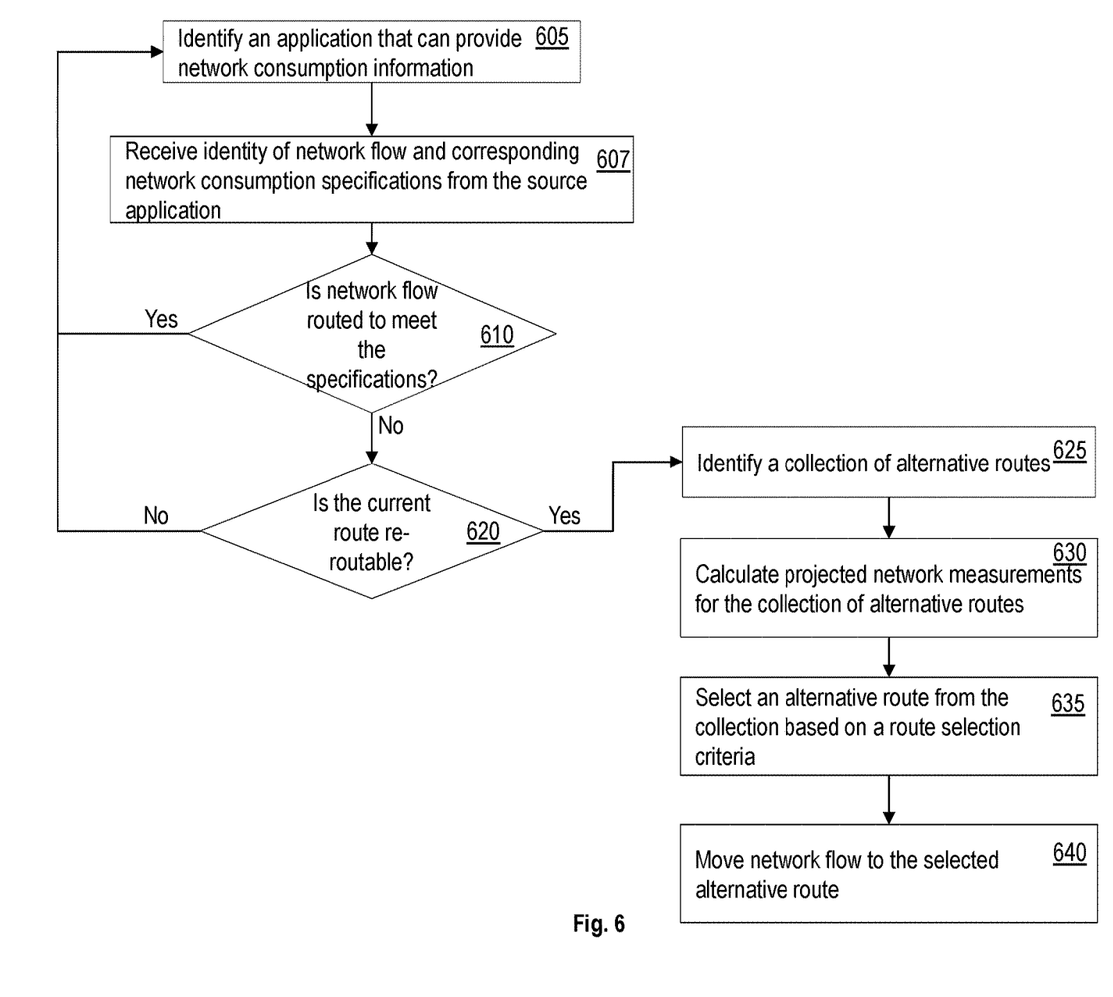
FIG. 6 is a flow diagram illustrating example logic of selecting an alternative route in accordance with an alternative embodiment.

In another example, the network administrator or the network policy may specify applications that may affect the behavior of the SDN 100, for example, by sending instructions for the SDN controller 120. FIG. 6 illustrates example logic of selecting an alternative route. The SDN controller 120 may implement at least a part of the logic. The logic may be included in instructions stored on the computer readable storage 128 and/or memory 126, and executed by the processor 124. The SDN controller 120 may receive identification of one or more applications, such as the source application 115, which may modify the route 205 being used for communication of packets to or from the applications. (605). For example, the network administrator may identify the source application 115 as an application authorized to send instructions to the SDN controller 120 to reroute the communication packets. Alternatively or in addition, the network administrator may identify types of applications that may instruct the SDN controller 120. For example, applications that transmit (or receive) real-time media packets may be authorized to reroute the packets. Other types of applications may be identified to reroute the packets in other examples. Alternatively or in addition, the network policy may identify the authorized applications or types of application.

The SDN controller 120 receives, from the source application 115, identity of a network flow that is to be rerouted. (607). For example, the source application 115 may identify attributes of the network flow to be rerouted for example, a flow source, a flow destination, a flow label, a protocol used by the flow, or any other such attribute. In addition, the source application 115 specifies, to the SDN controller 120, values of measurable attributes for smooth operation of the network flow. (607). For example, the source application 115 may specify latency requirements, throughput requirements, data volume, time deadline, and other such provisions for operating the network flow smoothly. The SDN controller 120 may reroute the network flow to meet the requested attribute values. Alternatively or in addition, the SDN controller 120 may schedule the network flow later to meet the time deadlines and meet the requested measurable attributes.

For example, the source application 115 may identify that it will begin transmission of a real-time network flow at 2:00 PM on Monday, Aug. 3, 2015, which will require predetermined values of measurable attributes such as a predetermined jitter value for smooth operation. Alternatively, the source application 115 may identify that the network flow includes transfer of a large data set that has to be completed by 7:00 AM on Monday, Aug. 3, 2015 or a large data set that will begin transfer at 1:00 AM, Aug. 4, 2015. Other network consumption specifications are possible in other examples. The SDN controller 120, based on the specifications from the source application 115, reroutes the network flow to optimize overall efficiency of the SDN 100. For example, in case of the real-time network flow, the SDN controller 120 identifies the route that satisfies the predetermined measurable attribute values that the source application 115 provided. In case of the transfer, the SDN controller routes the transfer so that the provide deadline is met, without affecting other network flows in the SDN 100. For example, the SDN controller 120 identifies that a lower latency is acceptable for the transfer, and accordingly reroutes the network flow using a route that is underutilized.

For example, the SDN controller 120 measures the measurable attributes of the route 205 that is being used to transmit the network flow. The SDN controller 120 compares the measured attributes with the specifications from the source application 115. (610). If the specifications are met, the SDN controller 120 does not reroute the network flow. If the specifications are not met, the SDN controller 120 may determine if the network administrator or the network policy has identified the route 205 as re-routeable. (620). For example, the SDN controller 120 may modify the route 205 for a network flow of the type FTP, SFTP, SMTP, or any other type of network flow. Other types of network flows may be specified.

The SDN controller 120 may identify a collection of alternative routes if the route 205 is re-routable and does not meet the specifications. (625). The SDN controller 120 may calculate projected network measurements for the SDN 100 for each of the alternative routes in the collection. (630). The SDN controller 120 may select the route 305 as the alternative route to use for the network flow based on the selection criteria that may be provided by the network administrator or the network policy and move the network flow to the route 305. (635, 640). The steps 625-640 may be similar to the steps 525-540 described in the present document.

Table 2 provides example routines that may be executed by the SDN controller 120 to implement the example methods described throughout the present application.

TABLE 2

```
Determine if route should be moved routine:
For each eligible application
        SDN identifies routes used by application and measures of the
        characteristics/attribution of that route
        if measurement action thresholds exceeded then
```

TABLE 2-continued

```
For each route or route type defined the administrator as being candidate for re-
routing
    If application derived route is one of the route or route types, then
        For each flow measurement
            Obtain flow measures /* the measures can be link specific, as well as an
            aggregation of link measurements */
            if aggregated flow measures exists then calculate aggregated flow
            measures
        end_for
        If (flow measures > flow measure action threshold) or (aggregated flow
        measure > aggregated flow measure action threshold) then go to move route
        routine
    End For
End For
```

Figure 7:
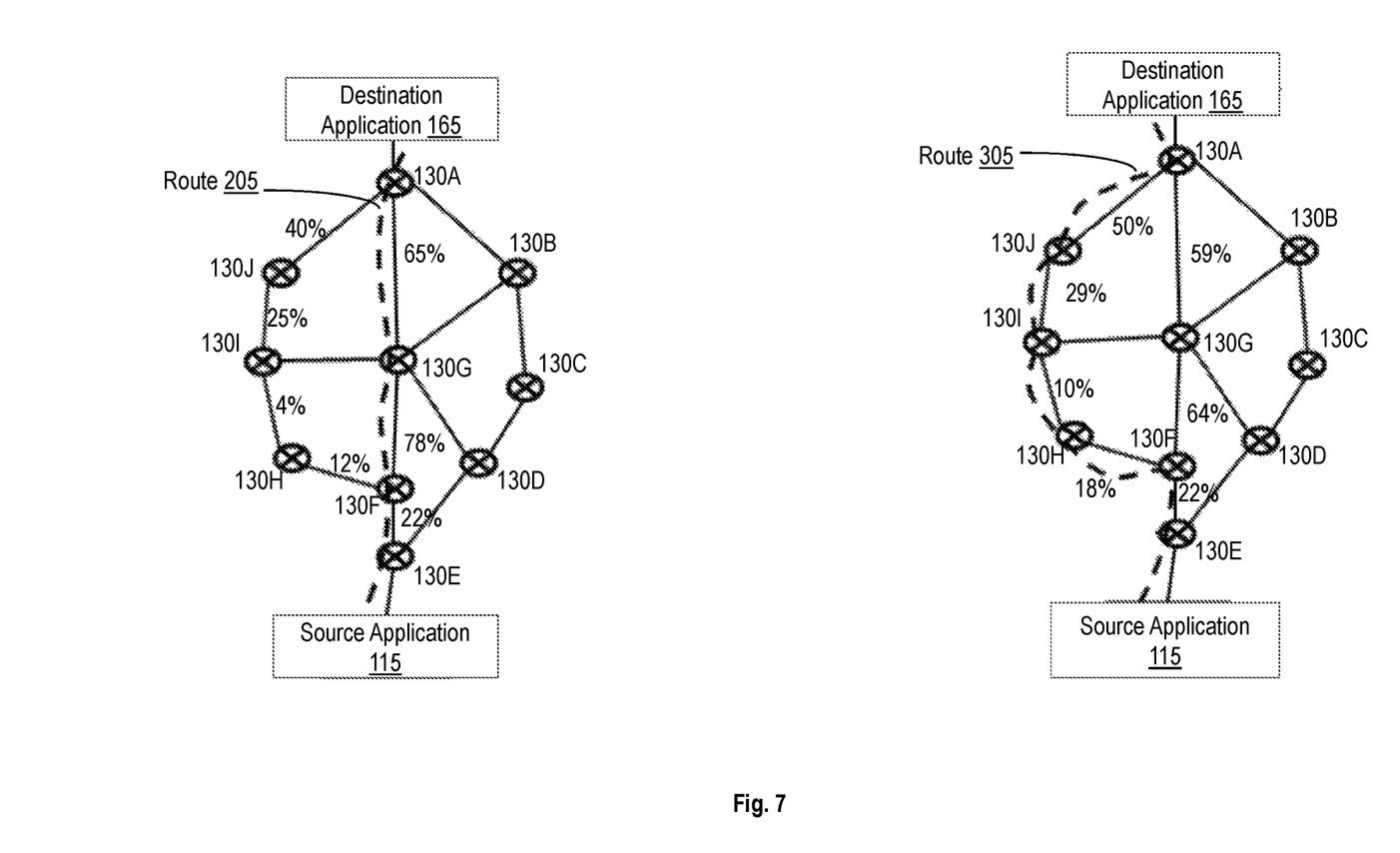
FIG. 7 illustrates an example implementation of rerouting a network flow.

FIG. 7 illustrates an example implementation of rerouting a network flow according to the technical solutions described throughout the present document. In the illustrated example, the SDN controller moves the route 205 to the route 305 to balance the link utilization in the SDN 100. The illustrated example uses link utilization as a measurable attribute; however, the SDN controller 120 may use other measurable attributes or combinations thereof as described throughout the present document. Other measures may be latency, throughput, data volume, and other such measurable network attributes.

In the example, the rerouting may be triggered in response to a trigger from the source application 115, or the network administrator, or according to the SDN controller 120 identifying a condition specified in the network policy. For example, the SDN controller 120 may initiate the rerouting in response to an individual link utilization exceeding a upper bound threshold, for example utilization >75%, or the individual link utilization exceeding a lower bound threshold, for example utilization <10%. Alternatively or in addition, the rerouting may be triggered by an aggregate link utilization exceeding a threshold. In an example, the SDN controller may initiate the rerouting process on a periodic basis, for example, every hour the routes are balanced. Other examples are may initiate the process in response to other events.

In an example, the SDN controller predicts capacity of the SDN 100 on a link-by-link basis. The SDN controller 120 may use the predicted capacity in the rerouting decision making process. For example, the routing nodes may use the ALTO Protocol (draft-ietf-alto-protocol-27) of RFC 5693 to provide information about measurable network attributes to the SDN controller 120.

The SDN controller 120, as part of a cleanup process, may remove the unused alternative routes that are created by this method. For example, the SDN controller 120 may identify the unused or other overlay routes and deletes them, based on business policies according to the network policy.

The examples described throughout the present document explain technical solutions for an SDN controller to receive input from applications and routing nodes, which an SDN controller uses to dynamically optimize an SDN without the need for reservations and or negotiations, such as Service Level Agreement (SLA) negotiations with applications. The technical solutions facilitate an application, not within the network itself, rather which is outside of the network scope, to describe to the SDN controller that for one or more of the flows emanating from that application, a desired flow behavior with respect to the network. In response, the SDN controller causes the network to adjust itself to achieve the application defined, application specific, and application communication flow specific network behavior.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus comprising:
   a memory device;
   a communication interface; and
   a processor coupled with the communication interface and the memory device, the processor configured to perform a method comprising:
   measuring an attribute of a first network route being used to communicate a first network flow between a first apparatus and a second apparatus;

comparing the attribute with a threshold from a specification associated with the first network flow, the specification comprising a scheduled time for the first network flow;

in response to the attribute being non-compliant with the threshold from the specification, selecting an alternative network route to communicate the first network flow between the first apparatus and the second apparatus; and routing the first network flow to be communicated via the alternative route between the first apparatus and the second apparatus, the routing comprising:

determining that a second network flow that is being routed via the alternative route is movable; and moving the second network flow to a second route.

2. The apparatus of claim 1, wherein the method further comprises:

identifying a collection of alternative routes between the first apparatus and the second apparatus, wherein the alternative route is selected from the collection of alternative routes.

3. The apparatus of claim 1, wherein the method further comprises:

identifying that the first network flow is of a first type, which is routable by the processor to the alternative route.

4. The apparatus of claim 3, wherein the method further comprises:

identifying that the first network route is being used to communicate a third network flow between the first apparatus and the second apparatus, wherein the third network flow is of a second type; and continuing to route the third network flow via the first network route in response to the third network flow being of the second type; and routing the first network flow to the alternative route in response to the first network flow being of the first type.

5. The apparatus of claim 1, wherein the attribute measured by the processor is specified by a network policy.

6. The apparatus of claim 5, wherein the attribute measured is one of latency, average utilization, peak utilization, jitter, a communication schedule, or a combination thereof.

7. The apparatus of claim 1, wherein the attribute measured by the processor is specified by an application that generates the first network flow.

8. The apparatus of claim 7, wherein the attribute measured is one of latency, average utilization, peak utilization, jitter, a communication schedule, or a combination thereof.

9. The apparatus of claim 1, wherein the scheduled time indicates a time for initiating the first network flow, and the attribute of the first network route is a predicted value of the attribute at the scheduled time.

10. The apparatus of claim 1, wherein the scheduled time indicates a time by which the first network flow is to be completed, and the attribute of the first network route is compared with the threshold to check for completion of the first network flow by the scheduled time.

11. The apparatus of claim 1, wherein the specification is received from a source application of the first network flow.

12. The apparatus of claim 1, wherein the specification is determined based on a type of the first network flow.

13. The apparatus of claim 12, wherein the type of the first network flow is a mail transfer using a predetermined mail transfer protocol.

14. The apparatus of claim 12, wherein the type of the first network flow is a file transfer using a predetermined file transfer protocol.

15. The apparatus of claim 1, wherein the first network flow is rerouted if the class of traffic associated with the first network flow is of a predetermined traffic class.

16. The apparatus of claim 15, wherein the predetermined traffic class is one from a group of traffic classes comprising a real-time voice class, a network control class, a general user class, a tape backup class.

17. A computer program product comprising a non-transitory computer readable storage medium including computer executable instructions, which when executed by a processing unit cause the processing unit to perform a method comprising:

measuring an attribute of a first network route being used to communicate a first network flow between a first apparatus and a second apparatus;

comparing the attribute with a threshold from a specification associated with the first network flow, the specification comprising a scheduled time for the first network flow;

in response to the attribute being non-compliant with the threshold from the specification, selecting an alternative network route to communicate the first network flow between the first apparatus and the second apparatus; and routing the first network flow to be communicated via the alternative route between the first apparatus and the second apparatus, the routing comprising:

determining that a second network flow that is being routed via the alternative route is movable; and moving the second network flow to a second route.

18. The computer program product of claim 17, wherein the method further comprises:

identifying a collection of alternative routes between the first apparatus and the second apparatus, wherein the alternative route is selected from the collection of alternative routes.

19. The computer program product of claim 17, wherein the method further comprises:

identifying that the first network flow is of a first type, which is routable to the alternative route.

20. The computer program product of claim 17, wherein the scheduled time indicates a time by which the first network flow is to be completed, and the attribute of the first network route is compared with the threshold to check for completion of the first network flow by the scheduled time.

* * * * *